United States Patent
Huynh

(10) Patent No.: US 10,030,175 B2
(45) Date of Patent: Jul. 24, 2018

(54) OPACIFYING LABEL

(75) Inventor: Dieu Dai Huynh, Courcouronnes (FR)

(73) Assignee: Avery Dennison Corporation, Glendale, CA (US)

( * ) Notice: Subject to any disclaimer, the term of this patent is extended or adjusted under 35 U.S.C. 154(b) by 644 days.

(21) Appl. No.: 12/677,527

(22) PCT Filed: Sep. 5, 2008

(86) PCT No.: PCT/US2008/075340
§ 371 (c)(1),
(2), (4) Date: Jun. 2, 2010

(87) PCT Pub. No.: WO2009/042371
PCT Pub. Date: Apr. 2, 2009

(65) Prior Publication Data
US 2010/0285258 A1    Nov. 11, 2010

Related U.S. Application Data

(60) Provisional application No. 60/975,897, filed on Sep. 28, 2007.

(51) Int. Cl.
| | | |
|---|---|---|
| *C09D 175/08* | (2006.01) | |
| *C08K 3/36* | (2006.01) | |
| *C09J 7/29* | (2018.01) | |
| *C09J 7/21* | (2018.01) | |
| *G09F 3/10* | (2006.01) | |

(52) U.S. Cl.
CPC .................... *C09J 7/29* (2018.01); *C08K 3/36* (2013.01); *C09D 175/08* (2013.01); *C08K 2201/006* (2013.01); *C09J 7/21* (2018.01); *C09J 2203/334* (2013.01); *C09J 2400/283* (2013.01); *C09J 2475/00* (2013.01); *G09F 3/10* (2013.01); *Y10T 428/1419* (2015.01)

(58) Field of Classification Search
CPC ..... C09J 7/29; C09J 7/0296; C09J 7/21; C09J 7/04; C09J 2475/00; C09J 2400/283; C09J 2203/334; Y10T 428/1419; C09D 175/08; C08L 175/08; C08K 3/36; C08K 2201/006
See application file for complete search history.

(56) References Cited

U.S. PATENT DOCUMENTS 3,113,986 A    12/1963    Breslow et al.
3,239,478 A    3/1966    Harlan, Jr.
(Continued)

FOREIGN PATENT DOCUMENTS

EP    0358445    11/1990
EP    0841432    5/1998
(Continued)

OTHER PUBLICATIONS

Sigma-Aldrich LUDOX AS-30 Colliodal Silica datasheet (Dec. 2010).*
(Continued)

*Primary Examiner* — Scott R. Walshon
(74) *Attorney, Agent, or Firm* — Avery Dennison Corporation

(57) ABSTRACT

A multilayer label having an opacifying layer coated onto the back side of a paper facestock is provided. The opacifying layer prevents the paper from losing opacity when the label is subjected to wet conditions.

20 Claims, 1 Drawing Sheet

(56) References Cited

U.S. PATENT DOCUMENTS

| | | | |
|---|---|---|---|
| 3,251,905 A | | 5/1966 | Zelinski |
| 3,390,207 A | | 6/1968 | Moss et al. |
| 3,598,887 A | | 8/1971 | Darcy et al. |
| 3,639,521 A | | 2/1972 | Hsieh |
| 4,208,356 A | | 6/1980 | Fukawa et al. |
| 4,219,627 A | | 8/1980 | Halasa et al. |
| 4,226,952 A | | 10/1980 | Halasa et al. |
| 4,578,429 A | | 3/1986 | Gergen et al. |
| 4,657,970 A | | 4/1987 | Shiraki et al. |
| 4,795,782 A | | 1/1989 | Lutz et al. |
| 5,164,444 A | | 11/1992 | Bernard |
| 5,232,958 A | | 8/1993 | Mallya et al. |
| 5,264,532 A | | 11/1993 | Bernard |
| 5,605,605 A | | 2/1997 | Coleman et al. |
| 5,623,011 A | | 4/1997 | Bernard |
| 5,691,043 A | | 11/1997 | Keller et al. |
| 5,705,551 A | | 1/1998 | Sasaki et al. |
| 5,898,049 A | * | 4/1999 | Muller et al. ............. 525/54.3 |
| 6,165,609 A | * | 12/2000 | Curatolo .............. G09F 3/0292 250/365 |
| 6,281,298 B1 | * | 8/2001 | Papsin, Jr. ................ 525/419 |
| 6,306,982 B1 | | 10/2001 | Lee et al. |
| 6,492,019 B1 | * | 12/2002 | Shipston et al. ....... 428/355 EN |
| 6,503,620 B1 | * | 1/2003 | Xie et al. ..................... 428/354 |
| 6,517,664 B1 | * | 2/2003 | Dronzek, Jr. ................ 156/328 |
| 6,761,969 B2 | | 7/2004 | Li et al. |
| 5,164,444 C3 | | 3/2006 | Bernard |
| 7,060,362 B2 | * | 6/2006 | Li et al. .................... 428/457 |
| 7,144,542 B2 | * | 12/2006 | Holzer et al. ........... 264/331.18 |
| 7,673,909 B2 | | 3/2010 | Rousselet |
| 8,088,492 B2 | * | 1/2012 | Huynh ..................... 428/423.1 |
| 8,790,759 B2 | | 7/2014 | Frankhuisen |
| 9,202,392 B2 | | 12/2015 | Frankhuisen |
| 9,561,640 B2 | | 2/2017 | Frankhuisen |
| 2001/0055677 A1 | * | 12/2001 | Wuu ............................ 428/343 |
| 2002/0146559 A1 | | 10/2002 | Touhsaent |
| 2003/0034645 A1 | | 2/2003 | Dronzek, Jr. et al. |
| 2003/0099827 A1 | * | 5/2003 | Shih et al. ................... 428/343 |
| 2004/0091645 A1 | * | 5/2004 | Heederik et al. ............ 428/32.1 |
| 2005/0118360 A1 | * | 6/2005 | Huynh ...................... 428/32.39 |
| 2005/0153110 A1 | * | 7/2005 | Juby ....................... B32B 27/10 428/195.1 |
| 2007/0248810 A1 | * | 10/2007 | McGee ................... C08J 7/047 428/323 |
| 2009/0029159 A1 | * | 1/2009 | Guo ....................... C09J 7/0257 428/354 |
| 2017/0132955 A1 | | 5/2017 | Frankhuisen |

FOREIGN PATENT DOCUMENTS

| | | |
|---|---|---|
| EP | 1367109 A1 | 12/2003 |
| EP | 1367109 B1 | 5/2005 |
| JP | 10/180970 | 7/1998 |
| WO | 91/16025 | 10/1991 |
| WO | 2007048878 A1 | 5/2007 |

OTHER PUBLICATIONS

International search report and written opinion issued in corresponding International application PCT/US2008/075340 dated May 12, 2008.

International preliminary report on patentability issued in corresponding International application PCT/US2008/075340 dated Apr. 8, 2010.

* cited by examiner

OPACIFYING LABEL

CROSS REFERENCE TO RELATED APPLICATION

The present application is a 371 of PCT/US2008/075340, which was published in English on Apr. 2, 2009, and claims priority to U.S. Provisional Patent Application No. 60/975,897 filed Sep. 28, 2007, both of which are incorporated herein by reference in their entireties.

FIELD OF THE INVENTION

The present invention relates to labels, and in particular, to labels having an opacifying layer for use in wet applications.

BACKGROUND

Paper labels are often preferred over polymeric labels for their appearance, printability and generally lower cost. However, in applications where the container or item to which the label is adhered is exposed to moist, humid or wet conditions, the appearance of the paper facestock may deteriorate. Specifically, the paper may lose its opacity and/or the paper may wrinkle causing the label to become difficult to read and decreasing the attractiveness of the container or item to which the label is adhered. In addition, if the paper becomes saturated, the label becomes susceptible to damage as it is more fragile.

Paper labels have traditionally been used for beverage containers such as wine bottles and beer bottles, which are often immersed in ice or ice water for cooling or being kept cool. To prevent the deterioration of the label and loss of opacity, the paper facestock can be overlaminated with a polymeric film or coating, which prevents or slows down the saturation of the paper facestock. In many applications, however, the appearance of the uncoated paper label is preferred.

This invention provides a paper label that does not lose opacity when exposed to wet conditions. The paper facestock is coated on its back side with a polymeric opacifying layer that may be optically clear or opaque. The opacifying layer prevents the uncoated paper facestock from losing opacity when the label is subjected to moisture, humidity or wet conditions.

SUMMARY

In one aspect of the invention, there is provided a label composite including: a paper substrate having an upper print surface and a lower surface; an opacifying layer covering the lower surface of the paper substrate, the opacifying layer formed from a coating composition including (a) at least one water-dispersible aliphatic polyether-polyurethane; and (b) at least one wax; and an adhesive layer adhered to the opacifying layer. In one embodiment, the opacifying layer further includes water dispersible silica particles. Alternately or additionally, in one embodiment, the wax comprises an anionic aqueous emulsion of wax.

The composition of the opacifying layer may include, one embodiment, (a) about 70% to about 98% by weight of at least one water-dispersible aliphatic polyether-polyurethane; and (b) about 1% to about 10% by weight of at least one wax. In one embodiment, the opacifying layer further includes about 0.1% to about 5% by weight of water dispersible silica particles.

DETAILED DESCRIPTION

Figure 1:
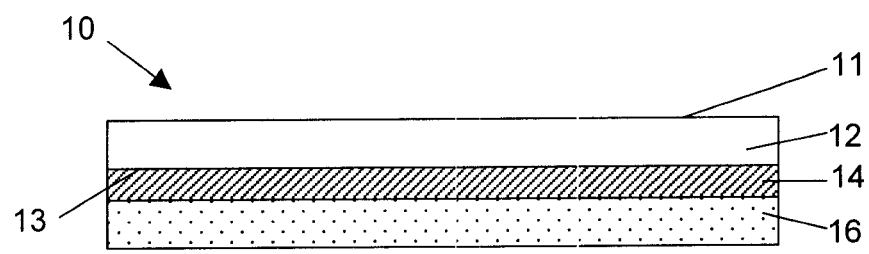
FIG. 1 is a schematic view illustrating a cross-section of a label composite according to the present invention.

The present invention is described in the following descriptions made with reference to FIG. 1. FIG. 1 is a schematic view of a cross section of one example of a label composite 10 according to the present invention. The label composite 10 may include a paper substrate 12 having an upper print surface 11 and a lower surface 13. An opacifying layer 14 covers the lower surface 13 of the paper substrate. Adhesive layer 16 is adhered to the opacifying layer 14.

The opacifying layer 14 includes (a) at least one water-dispersible aliphatic polyether-polyurethane; and (b) at least one wax. In one embodiment, the polyether-polyurethane polymer is the reaction product of a predominantly aliphatic polyisocyanate component and a polyether polyol component. As used herein, the term "predominantly aliphatic" means that at least 70 weight percent of the polyisocyanate component is an aliphatic polyisocyanate, in which all of the isocyanate groups are directly bonded to aliphatic or cycloaliphatic groups, irrespective of whether aromatic groups are also present. In one embodiment, the amount of aliphatic polyisocyanate is at least 85 weight %, and in another embodiment, 100 weight %, of the polyisocyanate component. Examples of suitable aliphatic polyisocyanates include ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisocyanate, p-tetra-methylxylene diisocyanate (p-TMXDI) and its meta isomer (m-TMXDI), hydrogenated 2,4-toluene diisocyanate, and 1-isocyanto-1-methyl-3(4)-isocyanatomethyl cyclohexane (IMCI). Mixtures of aliphatic polyisocyanates can be used. Suitable polyether polyols include products obtained by the polymerization of a cyclic oxide or by the addition of one or more such oxides to polyfunctional initiators. Such polymerized cyclic oxides include, for example, ethylene oxide, propylene oxide and tetrahydrofuran. Such polyfunctional initiators having oxides added include, for example, water, ethylene glycol, propylene glycol, diethylene glycol, cyclohexane dimethanol, glycerol, trimethylolpropane, pentaerythritol and Bisphenols (such as A and F).

Examples of commercially available polyether-polyurethanes include, but are not limited to NEOREZ R-563, and NEOREZ R-551 from DMS Neoresins. In one embodiment, the opacifying coating includes about 70% to about 98% by weight of a polyether-polyurethane.

The opacifying coating may also include a filler. Examples of fillers include silica, such as amorphous silica, fumed silica, colloidal silica, precipitated silica and silica gels. The filler is typically present in a minor amount. In one embodiment, the filler is present in an amount from about 0.1% to about 5%, or from about 0.3% to about 2% by weight, based on the total weight of the coating composition. In one embodiment, the filler includes silica in an amount of about 0.4% to about 1% by weight of the coating composition. Suitable silicas include those having a surface area of at least 10 m²/g, or at least 20 m²/g. In one embodiment, the surface area of the silica is greater than 200 m²/g, or greater than 500 m²/g.

In one embodiment the silica used includes micronized silica particles that range in size from about 2 to about 15 microns. A commercially available micronized silica is ML 644 from Micloid, which has a particle size of about 2 µm and a surface area of 600 m²/g and a pore volume of 0.8 ml/g.

In one embodiment, the opacifying layer includes a wax. The wax may be present in an amount from about 0.5% to about 20% by weight, or about 1% to about 10% by weight. Suitable waxes include one or more of the following waxes: paraffin wax, ozokerite, plant waxes such as olive wax, rice wax, hydrogenated jojoba wax or the absolute waxes of flowers, such as the essential wax of blackcurrent flower, animal waxes such as bees waxes or modified bees waxes (cerabellina); other waxes or waxy starting materials; marine waxes, natural or synthetic ceramides, and polyethylene or polyolefin waxes. In one embodiment, the wax includes a blend of paraffin and polyethylene wax.

The opacifying layer may be optically transparent or opaque. Pigments may be added to the coating composition to increase the opacity and/or modify the porosity of the coated substrate. In one embodiment, white pigment is added to the coating composition. An example of a useful commercially available pigment is Pigmatex, White NG, a non-ionic, surfactant based dispersion from Sun Chemical. Other additives such as defoamers, surfactants, antioxidants, UV stabilizers, crosslinkers, etc. may be included in the composition to obtain a certain desired characteristic.

Examples of suitable paper substrates include offset, bond, text, cover, index, lightweight printing paper, litho paper and sulfite paper.

The opacifying layer can be applied to the surface of the paper substrate using a conventional coating or other application technique. Examples of such techniques include slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating. For label products, the composition can be applied using any conventional technique or process including, for example, coating "on-press" during the converting process (e.g., in concert with the processes of die-cutting, matrix stripping, etc.), coating off-press using a separate coater, and other application methods. Suitable coat weights for paper substrates are 0.5 to 20 g/m², or 1.5 to 15 g/m².

When the composite paper is to be used as a label, the paper can be provided with an adhesive layer over the surface coated with the opacifying layer. The adhesive layer may include a pressure sensitive adhesive or a heat-activatable adhesive. The adhesive may be permanent or removable.

A description of useful pressure sensitive adhesives may be found in *Encyclopedia of Polymer Science and Engineering*, Vol. 13, Wiley-Interscience Publishers (New York, 1988). Additional description of useful PSAs may be found in *Polymer Science and Technology*, Vol. 1, Interscience Publishers (New York, 1964). Conventional PSAs, including acrylic-based PSAs, rubber-based PSAs and silicone-based PSAs are useful. The PSA may be a solvent based or may be a water based adhesive. Hot melt adhesives may also be used. In one embodiment, the PSA includes an acrylic emulsion adhesive.

In one embodiment, the adhesive may be formed from an acrylic based polymer. It is contemplated that any acrylic based polymer capable of forming an adhesive layer with sufficient tack to adhere to a substrate may function in the present invention. In certain embodiments, the acrylic polymers for the pressure-sensitive adhesive layers include those formed from polymerization of at least one alkyl acrylate monomer containing from about 4 to about 12 carbon atoms in the alkyl group, and present in an amount from about 35-95% by weight of the polymer or copolymer, as disclosed in U.S. Pat. No. 5,264,532. Optionally, the acrylic based pressure-sensitive adhesive might be formed from a single polymeric species.

The glass transition temperature of a PSA layer including acrylic polymers can be varied by adjusting the amount of polar, or "hard monomers", in the copolymer, as taught by U.S. Pat. No. 5,264,532, incorporated herein by reference. The greater the percentage by weight of hard monomers is an acrylic copolymer, the higher the glass transition temperature. Hard monomers contemplated useful for the present invention include vinyl esters, carboxylic acids, and methacrylates, in concentrations by weight ranging from about zero to about thirty-five percent by weight of the polymer.

The PSA can be acrylic based such as those taught in U.S. Pat. No. 5,164,444 (acrylic emulsion), U.S. Pat. No. 5,623,011 (tackified acrylic emulsion) and U.S. Pat. No. 6,306,982. The adhesive can also be rubber-based such as those taught in U.S. Pat. No. 5,705,551 (rubber hot melt). It can also be radiation curable mixture of monomers with initiators and other ingredients such as those taught in U.S. Pat. No. 5,232,958 (UV cured acrylic) and U.S. Pat. No. 5,232,958 (EB cured). The disclosures of these patents as they relate to acrylic adhesives are hereby incorporated by reference.

Commercially available PSAs are useful in the invention. Examples of these adhesives include the hot melt PSAs available from H.B. Fuller Company, St. Paul, Minn. as HM-1597, HL-2207-X, HL-2115-X, HL-2193-X. Other useful commercially available PSAs include those available from Century Adhesives Corporation, Columbus, Ohio. Another useful acrylic PSA includes a blend of emulsion polymer particles with dispersion tackifier particles as generally described in Example 2 of U.S. Pat. No. 6,306,982. The polymer is made by emulsion polymerization of 2-ethylhexyl acrylate, vinyl acetate, dioctyl maleate, and acrylic and methacrylic comonomers as described in U.S. Pat. No. 5,164,444 resulting in the latex particle size of about 0.2 microns in weight average diameters and a gel content of about 60%.

A commercial example of a hot melt adhesive is H2187-01, sold by Ato Findley, Inc., of Wauwatosa, Wis. In addition, rubber based block copolymer PSAs described in U.S. Pat. No. 3,239,478 also can be utilized in the adhesive constructions of the present invention, and this patent is hereby incorporated by a reference for its disclosure of such hot melt adhesives that are described more fully below.

In another embodiment, the pressure-sensitive adhesive includes rubber based elastomer materials containing useful rubber based elastomer materials include linear, branched, grafted, or radial block copolymers represented by the diblock structure A-B, the triblock A-B-A, the radial or coupled structures $(A-B)_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may include from about 75% to about 95% by weight of rubbery segments and from about 5% to about 25% by weight of non-rubbery segments.

The non-rubbery segments or hard blocks include polymers of mono- and polycyclic aromatic hydrocarbons, and more particularly vinyl-substituted aromatic hydrocarbons that may be monocyclic or bicyclic in nature. Rubbery materials such as polyisoprene, polybutadiene, and styrene butadiene rubbers may be used to form the rubbery block or segment. Particularly useful rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes that may be utilized include any of those that exhibit elastomeric properties. The block copolymers may be diblock, triblock, multiblock, starblock, polyblock or graftblock copolymers. Throughout this specification, the terms diblock, triblock, multiblock, polyblock, and graft or grafted-block with respect to the structural features of block copolymers are to be given their normal meaning as defined in the literature such as in the Encyclopedia of Polymer Science and Engineering, Vol. 2, (1985) John Wiley & Sons, Inc., New York, pp. 325-326, and by J. E. McGrath in Block Copolymers, Science Technology, Dale J. Meier, Ed., Harwood Academic Publishers, 1979, at pages 1-5.

Such block copolymers may contain various ratios of conjugated dienes to vinyl aromatic hydrocarbons including those containing up to about 40% by weight of vinyl aromatic hydrocarbon. Accordingly, multi-block copolymers may be utilized which are linear or radial symmetric or asymmetric and which have structures represented by the formulae A-B, A-B-A, A-B-A-B, B-A-B, $(AB)_{0, 1, 2}$ ... BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes that may be utilized to prepare the polymers and copolymers are those containing from 4 to about 10 carbon atoms and more generally, from 4 to 6 carbon atoms. Examples include from 1,3-butadiene, 2-methyl-1,3-butadiene(isoprene), 2,3-dimethyl-1,3-butadiene, chloroprene, 1,3-pentadiene, 1,3-hexadiene, etc. Mixtures of these conjugated dienes also may be used.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc.

Many of the above-described copolymers of conjugated dienes and vinyl aromatic compounds are commercially available. The number average molecular weight of the block copolymers, prior to hydrogenation, is from about 20,000 to about 500,000, or from about 40,000 to about 300,000.

The average molecular weights of the individual blocks within the copolymers may vary within certain limits. In most instances, the vinyl aromatic block will have a number average molecular weight in the order of about 2000 to about 125,000, or between about 4000 and 60,000. The conjugated diene blocks either before or after hydrogenation will have number average molecular weights in the order of about 10,000 to about 450,000, or from about 35,000 to 150,000.

Also, prior to hydrogenation, the vinyl content of the conjugated diene portion generally is from about 10% to about 80%, or from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives in the present invention include those available from Kraton Polymers LLC under the KRATON trade name.

Upon hydrogenation of the SBS copolymers including a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP).

A number of selectively hydrogenated block copolymers are available commercially from Kraton Polymers under the general trade designation "Kraton G." One example is Kraton G1652 which is a hydrogenated SBS triblock including about 30% by weight of styrene end blocks and a midblock which is a copolymer of ethylene and 1-butene (EB). A lower molecular weight version of G1652 is available under the designation Kraton G1650. Kraton G1651 is another SEBS block copolymer which contains about 33% by weight of styrene. Kraton G1657 is an SEBS diblock copolymer which contains about 13% w styrene. This styrene content is lower than the styrene content in Kraton G1650 and Kraton G1652.

In another embodiment, the selectively hydrogenated block copolymer is of the formula:

$$B_n(AB)_o A_p$$

wherein n=0 or 1; o is 1 to 100; p is 0 or 1; each B prior to hydrogenation is predominantly a polymerized conjugated diene hydrocarbon block having a number average molecular weight of about 20,000 to about 450,000; each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction of the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder.

Examples of commercially available maleated selectively hydrogenated copolymers of styrene and butadiene include Kraton FG1901X, FG1921X, and FG1924X, often referred to as maleated selectively hydrogenated SEBS copolymers. FG1901X contains about 1.7% w bound functionality as succinic anhydride and about 28% w of styrene. FG1921X contains about 1% w of bound functionality as succinic anhydride and 29% w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

Unsaturated elastomeric polymers and other polymers and copolymers which are not inherently tacky can be rendered tacky when compounded with an external tackifier. Tackifiers, are generally hydrocarbon resins, wood resins, rosins, rosin derivatives, and the like, which when present in concentrations ranging from about 40% to about 90% by weight of the total adhesive composition, or from about 45% to about 85% by weight, impart pressure-sensitive adhesive characteristics to the elastomeric polymer adhesive formulation. Compositions containing less than about 40% by weight of tackifier additive do not generally show sufficient "quickstick," or initial adhesion, to function as a pressure-sensitive adhesive, and therefore are not inherently tacky. Compositions with too high a concentration of tackifying additive, on the other hand, generally show too little cohesive strength to work properly in most intended use applications of constructions made in accordance with the instant invention.

It is contemplated that any tackifier known by those of skill in the art to be compatible with elastomeric polymer compositions may be used with the present embodiment of the invention. One such tackifier, found useful is Wingtak 10, a synthetic polyterpene resin that is liquid at room temperature, and sold by the Goodyear Tire and Rubber Company of Akron, Ohio. Wingtak 95 is a synthetic tackifier resin also available from Goodyear that includes predominantly a polymer derived from piperylene and isoprene. Other suitable tackifying additives may include Escorez 1310, an aliphatic hydrocarbon resin, and Escorez 2596, a $C_5$-$C_9$ (aromatic modified aliphatic) resin, both manufactured by Exxon of Irving, Tex. Of course, as can be appreciated by those of skill in the art, a variety of different tackifying additives may be used to practice the present invention.

In addition to the tackifiers, other additives may be included in the PSAs to impart desired properties. For example, plasticizers may be included, and they are known to decrease the glass transition temperature of an adhesive composition containing elastomeric polymers. An example of a useful plasticizer is Shellflex 371, a naphthenic processing oil available from Shell Lubricants of Texas. Antioxidants also may be included on the adhesive compositions. Suitable antioxidants include Irgafos 168 and Irganox 565 available from Ciba-Geigy, Hawthorne, N.Y. Cutting agents such as waxes and surfactants also may be included in the adhesives.

The pressure sensitive adhesive may be applied from a solvent, emulsion or suspension, or as a hot melt. The adhesive may be applied to the inner surface of the shrink film by any known method. For example, the adhesive may be applied by die coating curtain coating, spraying, dipping, rolling, gravure or flexographic techniques. The adhesive may be applied to the opacifying layer in a continuous layer, a discontinuous layer or in a pattern.

The outer print surface of the paper may be surface treated to improve the printability of the paper substrate. For example, a surface coating of a pigment such as clay and an adhesive such as starch may be applied to the paper. In one embodiment, a thin coating of the opacifying coating composition described herein may be applied to the print surface of the paper.

EXAMPLES

The following examples are intended only to illustrate methods and embodiments in accordance with the invention, and as such should not be construed as imposing limitations upon the claims.

Example 1

A transparent opacifying coating composition including the ingredients listed in Table 1 is prepared as follows:

TABLE 1

| Ingredient | Wt. % |
| --- | --- |
| Polyurethane dispersion NEOREZ R-563: aliphatic polyether urethane dispersion, 35.5% solids) | 94.5 |
| Silica Micloid ML 644 (100% solids) | 0.5 |
| Paraffin-polyethylene wax emulsion Michem ® Lube 135 | 5.0 |

The coating composition is coated onto a paper substrate. The coating is dried at a temperature of about 90° C. and a line speed of about 120 meters/minute to form an opacifying layer. The dry coat weight of the opacifying layer is about 2.0 g/m$^2$.

Example 2

A white opacifying coating composition including the ingredients listed in Table 2 is prepared as follows:

TABLE 2

| Ingredient | Wt. % |
| --- | --- |
| Polyurethane dispersion NEOREZ R-563: aliphatic polyether urethane dispersion, 35.5% solids) | 74.5 |
| Silica Micloid ML 644 (100% solids) | 0.5 |
| Paraffin-polyethylene wax emulsion Michem ® Lube 135 | 5.0 |
| White pigment (TiO$_2$) | 20.0 |

The coating composition is coated onto a paper substrate. The coating is dried at a temperature of about 90° C. and a line speed of about 120 meters/minute to form an opacifying layer. The dry coat weight of the opacifying layer is about 5.0 g/m$^2$.

Example 3

A transparent opacifying coating composition including the ingredients listed in Table 3 is prepared as follows:

TABLE 3

| Ingredient | Wt. % |
| --- | --- |
| Polyurethane dispersion NEOREZ R-563: aliphatic polyether urethane dispersion, 35.5% solids) | 95.0 |
| Paraffin-polyethylene wax emulsion Michem ® Lube 135 | 5.0 |

The coating composition is coated onto a paper substrate. The coating is dried at a temperature of about 90° C. and a line speed of about 120 meters/minute to form an opacifying layer. The dry coat weight of the opacifying layer is about 2.0 g/m$^2$.

Example 4

A white opacifying coating composition including the ingredients listed in Table 4 is prepared as follows:

TABLE 4

| Ingredient | Wt. % |
| --- | --- |
| Polyurethane dispersion NEOREZ R-563: aliphatic polyether urethane dispersion, 35.5% solids) | 74.9 |
| Paraffin-polyethylene wax emulsion Michem ® Lube 135 | 5.0 |
| White pigment (TiO$_2$) | 20.1 |

The coating composition is coated onto a paper substrate. The coating is dried at a temperature of about 90° C. and a line speed of about 120 meters/minute to form an opacifying layer. The dry coat weight of the opacifying layer is about 5.0 g/m$^2$.

A label composite constructed from a paper substrate having an opacifying layer applied thereto and a layer of pressure sensitive adhesive is applied by conventional method to a wine bottle. Upon immersion in water, the label composite retains sufficient opacity to provide a label useful for wet applications.

While the invention has been explained in relation to embodiments, it is to be understood that various modifications thereof will become apparent to those skilled in the art upon reading the specification. Therefore, it is to be understood that the invention disclosed herein is intended to cover such modifications as fall within the scope of the appended claims, and to cover insubstantial variations thereof.

What is claimed is:

1. A label composite comprising:
    a paper substrate having an upper print surface and a lower surface;
    an opacifying layer covering the lower surface of the paper substrate, the opacifying layer formed from a coating composition comprising (a) at least one water-dispersible aliphatic polyether-polyurethane; (b) at least one wax; and (c) about 0.3% to about 2% by weight of water dispersible silica particles; and
    an adhesive layer adhered to the opacifying layer;
    wherein the paper substrate is an outermost layer of the label composite; and
    wherein the silica particles have a surface area greater than 500 m$^2$/g.

2. The label composite of claim 1 wherein the upper print surface is surface treated to improve its printability.

3. The label composite of claim 1 wherein the aliphatic polyether polyurethane comprises the reaction product of an aliphatic polyisocyanate component and a polyether polyol component.

4. The label composite of claim 1 wherein the at least one wax comprises an anionic aqueous emulsion of wax.

5. The label composite of claim 1 wherein the coating composition further comprises a pigment.

6. The label composite of claim 5 wherein the pigment comprises TiO$_2$.

7. The label composite of claim 1 wherein the amount of the at least one water-dispersible aliphatic polyether-polyurethane in the coating composition is in the range of about 70% to about 98% by weight; and wherein the amount of the at least one wax in the coating composition is in the range of about 1% to about 10% by weight.

8. The label composite of claim 1 wherein the adhesive comprises a pressure sensitive adhesive.

9. The label composite of claim 1 wherein the adhesive comprises a heat activatable adhesive.

10. The label composite of claim 1 wherein the at least one wax comprises a blend of paraffin and polyethylene wax.

11. The label composite of claim 1 wherein the opacifying layer is opaque.

12. The label composite of claim 1 wherein the opacifying layer consists of (a) the at least one water-dispersible aliphatic polyether-polyurethane; (b) the at least one wax; and (c) the water dispersible silica particles.

13. The label composite of claim 1 wherein the opacifying layer further comprises a white pigment.

14. The label composite of claim 1 wherein the water dispersible silica particles range in size from about 2 to about 15 microns.

15. A label composite consisting of:
   a paper substrate having an upper print surface and a lower surface;
   an opacifying layer covering the lower surface of the paper substrate, the opacifying layer formed from a coating composition comprising (a) at least one water-dispersible aliphatic polyether-polyurethane; (b) at least one wax; and (c) about 0.3% to about 2% by weight of water dispersible silica particles; and
   an adhesive layer adhered to the opacifying layer;
   wherein the silica particles have a surface area greater than 500 m$^2$/g.

16. The label composite of claim 15, wherein the coating composition comprises (a) about 70% to about 98% by weight of the at least one water-dispersible aliphatic polyether-polyurethane; (b) about 1% to about 10% by weight of the at least one wax; and (c) about 0.3% to about 2% by weight of water dispersible silica particles.

17. The label composite of claim 16, wherein the amount of the water dispersible silica particles in the coating composition is in the range of about 0.4% to about 1% by weight.

18. The label composite of claim 15, wherein the amount of the water dispersible silica particles in the coating composition is in the range of about 0.4% to about 1% by weight.

19. A label composite comprising:
   a paper substrate having an upper print surface and a lower surface;
   an opacifying layer covering the lower surface of the paper substrate, the opacifying layer formed from a coating composition comprising (a) about 70% to about 98% by weight of at least one water-dispersible aliphatic polyether-polyurethane; (b) about 1% to about 10% by weight of at least one wax; and (c) about 0.3% to about 2% by weight of water dispersible silica particles;
   an adhesive layer adhered to the opacifying layer;
   wherein the silica particles have a surface area greater than 500 m$^2$/g.

20. The label composite of claim 19, wherein the amount of the water dispersible silica particles in the coating composition is in the range of about 0.4% to about 1% by weight.

* * * * *